United States Patent
Yumoto et al.

(10) Patent No.: US 11,004,174 B2
(45) Date of Patent: May 11, 2021

(54) LENTICULAR IMAGE FORMATION METHOD

(71) Applicant: GRAPAC JAPAN CO., INC., Tokyo (JP)

(72) Inventors: Yoshihide Yumoto, Tokyo (JP); Kazushi Omori, Tokyo (JP)

(73) Assignee: GRAPAC JAPAN CO., INC., Tokyo (JP)

( * ) Notice: Subject to any disclaimer, the term of this patent is extended or adjusted under 35 U.S.C. 154(b) by 70 days.

(21) Appl. No.: 16/348,778

(22) PCT Filed: Jan. 29, 2018

(86) PCT No.: PCT/JP2018/002706
§ 371 (c)(1),
(2) Date: May 9, 2019

(87) PCT Pub. No.: WO2019/026312
PCT Pub. Date: Feb. 7, 2019

(65) Prior Publication Data
US 2020/0065938 A1    Feb. 27, 2020

(30) Foreign Application Priority Data

Aug. 1, 2017   (JP) .............................. JP2017-149497

(51) Int. Cl.
*G06T 3/40*    (2006.01)
*G06T 3/20*    (2006.01)
(Continued)

(52) U.S. Cl.
CPC .............. *G06T 3/40* (2013.01); *G02B 3/005* (2013.01); *G02B 3/06* (2013.01); *G06T 3/20* (2013.01)

(58) Field of Classification Search
CPC .. G06T 3/40; G06T 3/20; G02B 3/005; G02B 3/06; G02B 3/00; G02B 30/27;
(Continued)

(56) References Cited

U.S. PATENT DOCUMENTS 5,364,274 A * 11/1994 Sekiguchi ............... G09F 11/26
434/365
2004/0109010 A1    6/2004 Blish et al.
(Continued)

FOREIGN PATENT DOCUMENTS

GB     1019109 A      2/1966
JP    2000-098948 A   4/2000
(Continued)

OTHER PUBLICATIONS

PCT/ISA/210, "International Search Report for International Application No. PCT/JP2018/002706," dated Apr. 17, 2018.

*Primary Examiner* — Jon Chang
(74) *Attorney, Agent, or Firm* — Manabu Kanesaka (57) ABSTRACT

A variable image display body and a lenticular image formation method that are capable of displaying a variable image without incongruity are provided. In a variable image display body, lenticular images are composed of arranged image strips obtained by scaling a plurality of images so that subject images appearing in the respective images have the same size, subjecting the scaled images to position adjustment so that reference portions of the subject images in the scaled images are located at the same position, in the superimposed state, trimming a region in which a predetermined number of the scaled images are overlapped and the subject images are included, and extracting image strips in the form of lines from each of the trimmed images.

6 Claims, 10 Drawing Sheets

(51) Int. Cl.
*G02B 3/00* (2006.01)
*G02B 3/06* (2006.01)

(58) Field of Classification Search
CPC .... G03B 25/02; G09F 19/14; H04N 1/00201; H04N 13/305
See application file for complete search history.

(56) References Cited

U.S. PATENT DOCUMENTS

| | | | |
|---|---|---|---|
| 2012/0169840 A1* | 7/2012 | Yamashita | H04N 5/23232 348/36 |
| 2013/0216128 A1* | 8/2013 | Zomet | H04N 1/387 382/162 |
| 2015/0198815 A1* | 7/2015 | Orimoto | G03B 35/24 358/1.18 |

FOREIGN PATENT DOCUMENTS

| | | |
|---|---|---|
| JP | 2003-241699 A | 8/2003 |
| JP | 2004-104426 A | 4/2004 |

\* cited by examiner

FIG. 12 ial Phase of International
LENTICULAR IMAGE FORMATION METHOD

RELATED APPLICATIONS

The present application is National Phase of International Application No. PCT/JP2018/002706 filed Jan. 29, 2018, and claims priority from Japanese Application No. 2017-149497, filed Aug. 1, 2017, the disclosure of which is hereby incorporated by reference herein in its entirety.

TECHNICAL FIELD

The present invention relates to a variable image display body including a lenticular sheet having a plurality of cylindrical lenses arranged in a first direction, and lenticular images arranged on a surface on the opposite side to the surface of the cylindrical lenses, and relates to a method of forming lenticular images.

BACKGROUND ART

There is a technique of displaying a variable image, such as a changing or moving image, by switching pictures, depending on a viewing angle, using a lenticular sheet on which a plurality of cylindrical lenses are arranged in parallel. On the lenticular sheet, subdivided images in the form of lines corresponding to the cylindrical lenses, respectively, are arranged on a surface on the opposite side of the lenticular sheet to the cylindrical lenses. Thus, when a user views the images through the cylindrical lenses, the viewed images are switched with a change in the angle of viewing the images, and can be observed like moving images.

With respect to an image display using such a lenticular sheet, for example, Patent Literature 1 discloses a technique of reducing cross-talk at the time of observation and allowing clear changing by inserting images obtained by extracting portions where there is no change into the arranged images in a stereoscopic, animated or changing image display system comprising a lenticular sheet equivalent to lenticular lenses, and sampling images synthesized using a plurality of images.

CITATION LIST

Patent Literature

[Patent Literature 1]
Japanese Patent Laid-Open No. 2000-98948

SUMMARY OF INVENTION

Technical Problem

For example, there is a case where a variable image display is enjoyed using images obtained by continuously shooting a moving train or car. In this case, there are roughly four methods.

The first method is a method in which the background is fixed using a single (still) image, and a subject image is moved on the fixed background image. In this case, as the subject image, a single image may be moved left or right, or a plurality of images may be synthesized. In this method, however, since the background does not change, it is easy to recognize that the image is a synthesized image, lacking sense of reality. Since the subject is moving, there is a problem that it is difficult to reproduce the details of the subject, such as the motion of rotation of wheels and the smoke of a train.

The second method is a method in which the background is synthesized using a plurality of images, the synthesized background image is fixed, and a subject image is moved on the background image. More specifically, the synthesized image of background is produced and fixed while positioning the images so that the background is not moved. Then, the image of the subject is moved on the background. The subject image may be a fixed image (synthesized still image) or a synthetized image from a plurality of images. In this method, since the subject moves left or right, it is possible to express the movement of the subject, but still there is the problem that it is difficult to reproduce the details of the subject, such as the motion of rotation of wheels and the smoke of a train, because the subject is moving.

A third method is a method in which a single subject image is fixed and the background is moved. According to this method, the subject can be reproduced sharply, but the image lacks fun because there is no change in the details of the subject such as the motion of rotation of wheels and the smoke of a train.

A fourth method synthesizes a subject image in a fixed manner using a plurality of images. In other words, it is a method in which the subject image is fixed, and a plurality of images are synthesized from both of the background and subject images. This method has the advantageous effects that it is possible to reproduce the details of the subject such as the motion of rotation of wheels and the smoke of a train associated with movement, and express the sense of reality. However, with a change in the distance between the camera and the subject at the time of shooting, the subject appears in different sizes in the respective captured images. Then, if such captured images are used to form lenticular images for variable display by producing and fixing a synthetized image of the subject and designing only a synthesized background image to be movable, a change in the size of the subject is noticeable. For example, while a train or car is moving from left to right in a variable image display like a moving image moving from left to light, the train or car is seen as if the size thereof is changing, like extending or shrinking, thereby causing incongruity.

In view of the problem of the fourth method, it is an object of the present invention to provide a variable image display body and a lenticular image formation method that are capable of displaying a variable image without incongruity.

Solution to Problem

A variable image display body in the present invention is a variable image display body comprising a lenticular sheet having a plurality of cylindrical lenses arranged in a first direction, and lenticular images arranged on a surface on an opposite side to a surface of the cylindrical lenses, wherein source images of the lenticular images are a plurality of captured images obtained by continuously shooting a moving body as a subject and include subject images which are images of the moving body appearing in the plurality of captured images and moving in at least the first direction, and the lenticular images are composed of display image strips arranged at positions corresponding to the respective cylindrical lenses, the display image strips being obtained by: scaling each of the plurality of captured images so that the subject images appearing in the plurality of captured images have the same size; subjecting the plurality of scaled captured images to position adjustment so that reference portions of the subject images in the plurality of scaled captured images are located at a same position, and superimposing the plurality of scaled captured images, and in the superimposed state, trimming a region in which a predetermined number of the plurality of scaled captured images are overlapped and the subject images are included; and extracting display image strips in the form of lines from each of the trimmed captured images.

It may be desired that the variable image display body further includes; the subject image appearing in one captured image among the plurality of captured images is used as a reference subject image, and other captured image among the plurality of captured images is scaled so that the subject image appearing in the other captured image has the same size as the reference subject image.

It may be desired that the variable image display body further includes; the captured image having the subject image appearing largest in size among the plurality of captured images is the one captured image.

It may be desired that the variable image display body further includes; a scaling factor is calculated based on: a size A1 of the moving body in a moving direction; the one captured image which is an image shot at the time the moving body came closest to a shooting point, and a straight line distance X1 between the moving body and the shooting point at the time wherein; and an angle θ1 formed between a straight line connecting the moving body and the shooting point when the one captured image was shot and a straight line connecting the moving body and the shooting point when the other captured image was shot.

It may be desired that the variable image display body further includes; the other captured image is scaled in the first direction by a first scaling factor obtained by Expression 1, and the other captured image is scaled in a second direction orthogonal to the first direction by a second scaling factor obtained by Expression 2.

[Math. 1]

$$\frac{X_1}{\sqrt{X_1^2 + (X_1 * \tan\theta_1)^2}} \quad \text{Expression 1}$$

$$\frac{A_1}{\sqrt{X_1^2 + (X_1 * \tan\theta_1)^2} \ * \ \tan\left(\arctan\left(\frac{(X_1 * \tan\theta_1) + A_1}{X_1}\right) - \theta_1\right)} \quad \text{Expression 2}$$

A lenticular image formation method in the present invention is the lenticular image formation method for forming lenticular images for displaying a variable image by functioning with a lenticular sheet having a plurality of cylindrical lenses arranged in a first direction, wherein source images of the lenticular images are a plurality of captured images obtained by continuously shooting a moving body as a subject and include subject images which are images of the moving body appearing in the plurality of captured images and moving in at least the first direction, the method comprising the steps of: scaling each of the plurality of captured images so that the subject images appearing in the plurality of captured images have the same size; subjecting the plurality of scaled captured images to position adjustment so that reference portions of the subject images in the plurality of scaled captured images are located at a same position, and superimposing the plurality of scaled captured images, and in the superimposed state, trimming a region in which a predetermined number of the plurality of scaled captured images are overlapped and the subject images are included; and forming image strips arranged in a predetermined order by extracting the images in the form of lines from each of the trimmed captured images.

It may be desired that the lenticular image formation method further includes; the subject image appearing in one captured image among the plurality of captured images is used as a reference subject image, and other captured image among the plurality of captured images is scaled so that the subject image appearing in the other captured image has the same size as the reference subject image.

It may be desired that the lenticular image formation method further includes; the captured image having the subject image appearing largest in size among the plurality of captured images is the one captured image.

It may be desired that the lenticular image formation method further includes; a scaling factor is calculated based on: a size A1 of the moving body in a moving direction; the one captured image which is an image shot at the time the moving body came closest to a shooting point, and a straight line distance X1 between the moving body and the shooting point at the time; and an angle θ1 formed between a straight line connecting the moving body and the shooting point when the one captured image was shot and a straight line connecting the moving body and the shooting point when the other captured image was shot.

It may be desired that the lenticular image formation method further includes; the other captured image is scaled in the first direction by a first scaling factor obtained by Expression 1, and the other captured image is scaled in a second direction orthogonal to the first direction by a second scaling factor obtained by Expression 2.[Math. 1]

$$\frac{X_1}{\sqrt{X_1^2 + (X_1 * \tan\theta_1)^2}} \quad \text{Expression 1}$$

$$\frac{A_1}{\sqrt{X_1^2 + (X_1 * \tan\theta_1)^2} \ * \ \tan\left(\arctan\left(\frac{(X_1 * \tan\theta_1) + A_1}{X_1}\right) - \theta_1\right)} \quad \text{Expression 2}$$

Advantageous Effects of Invention

According to a variable image display body of the present invention, it is possible to display a variable image without incongruity.

According to a lenticular image formation method of the present invention, it is possible to realize lenticular images capable of displaying a variable image without incongruity.

DESCRIPTION OF EMBODIMENT

The following will describe an embodiment of the present invention with reference to the drawings. It should be noted that the embodiment described below is merely illustrative and is not intended to exclude various modifications and applications of techniques which are not specified below. In other words, the present invention can be modified in various ways (such as by combining examples of the embodiment) as long as the effects are exerted. Further, in the description of the drawings below, the same or similar parts are labeled by the same or similar reference signs. The drawings are schematic and do not always coincide with actual dimensions, ratios, etc. There may be differences in the dimensional relationships and ratios among the drawings.

Figure 1:
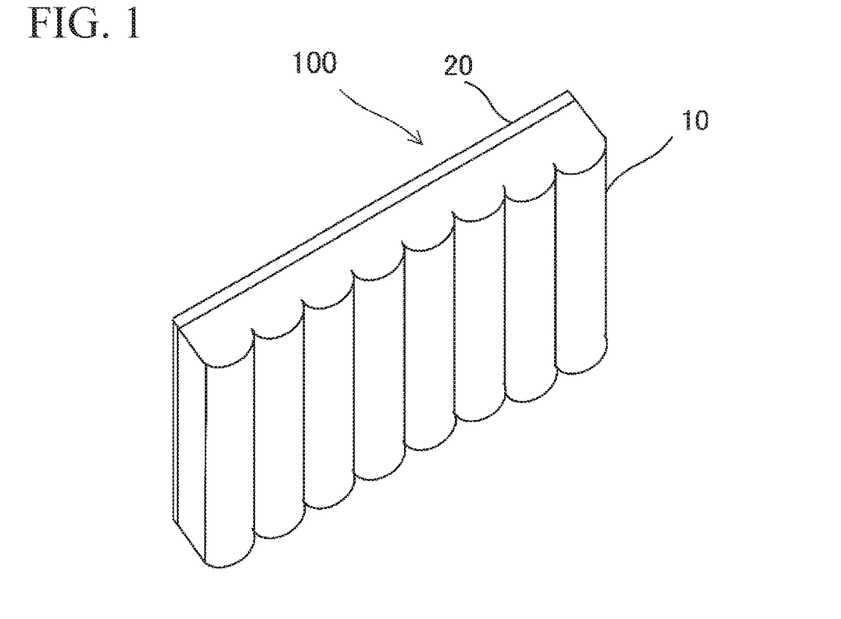
FIG. 1 is a schematic diagram showing an example of a variable image display body of the present invention.
Figure 2:
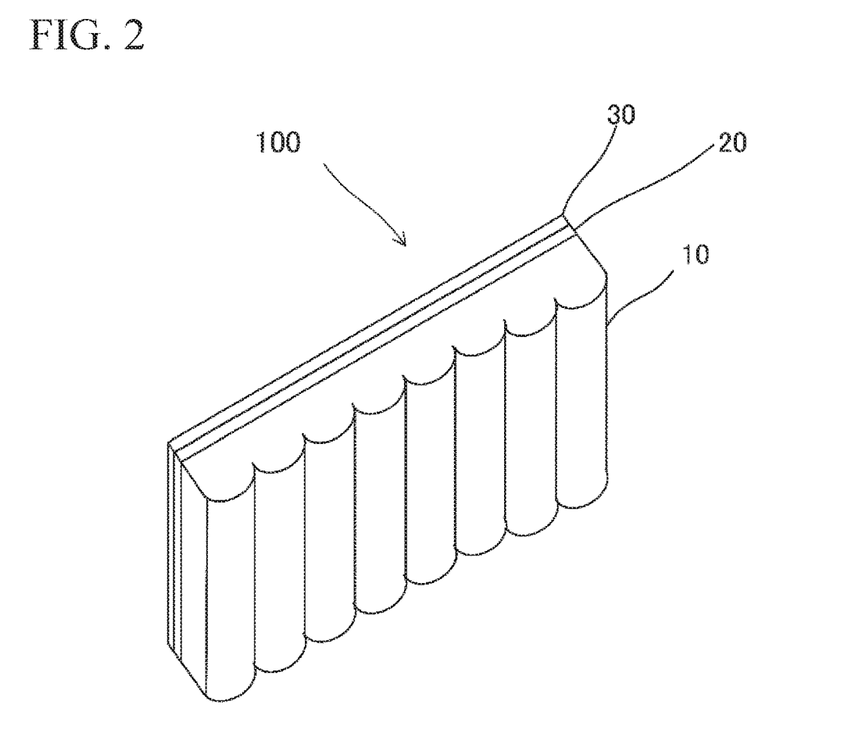
FIG. 2 is a schematic diagram showing another example of a variable image display body of the present invention.

FIG. 1 is a schematic diagram showing an example of a variable image display body of the present invention, and FIG. 2 is a schematic diagram showing another example of a variable image display body of the present invention.

As shown in FIGS. 1 and 2, a variable image display body 100 of the present invention includes a lenticular sheet 10 having cylindrical lenses, each having a semi-cylindrical shape and arranged in parallel, and lenticular images 20. The lenticular images 20 are arranged on a surface on the opposite side to the surface of the cylindrical lenses.

Alternatively, for example, the variable image display body 100 may be configured by forming the lenticular images 20 on an image formation medium 30 as shown in FIG. 2 and superimposing the image formation medium 30 with the lenticular images 20 on the lenticular sheet 10. The image formation medium 30 is, for example, a paper, a wood plate, a film, or a metal.

In this embodiment, for example, a subject such as a train is shot continuously a plurality times, and images captured are used as source images. The source images are explained as an example of images of the present invention.

Figure 3:
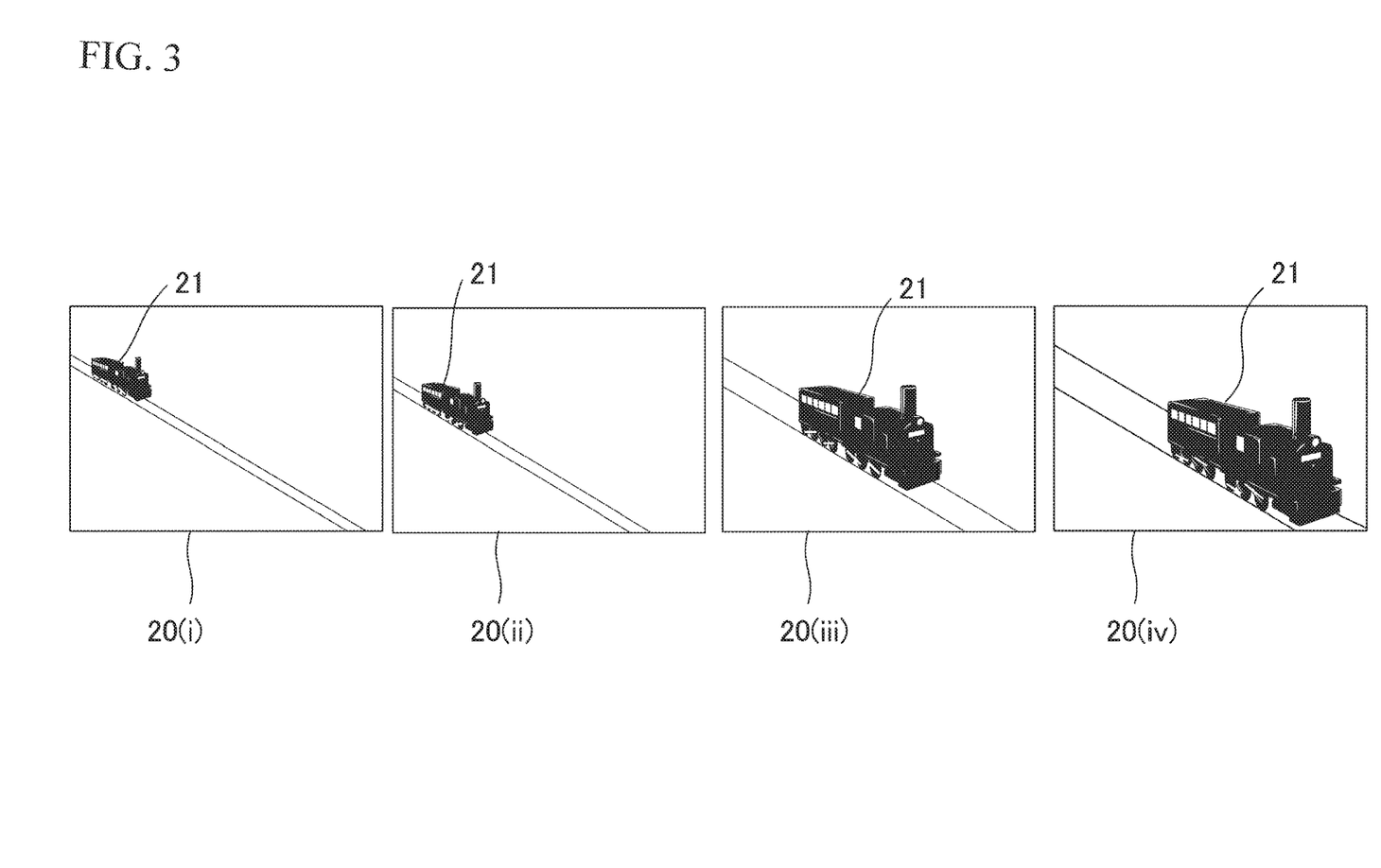
FIG. 3 is an explanatory diagram showing an example of captured images.
Figure 4:
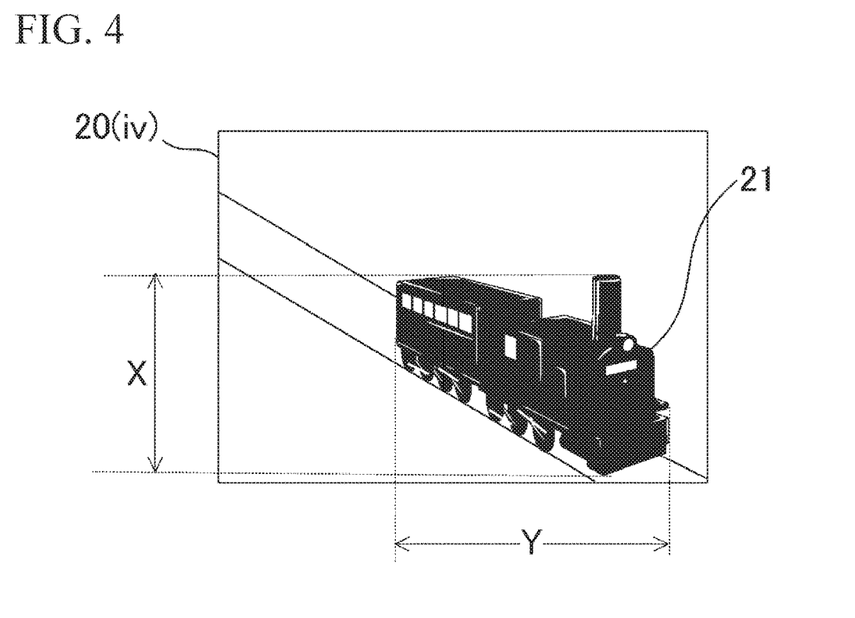
FIG. 4 is an explanatory diagram showing an example of a reference subject image.
Figure 5:
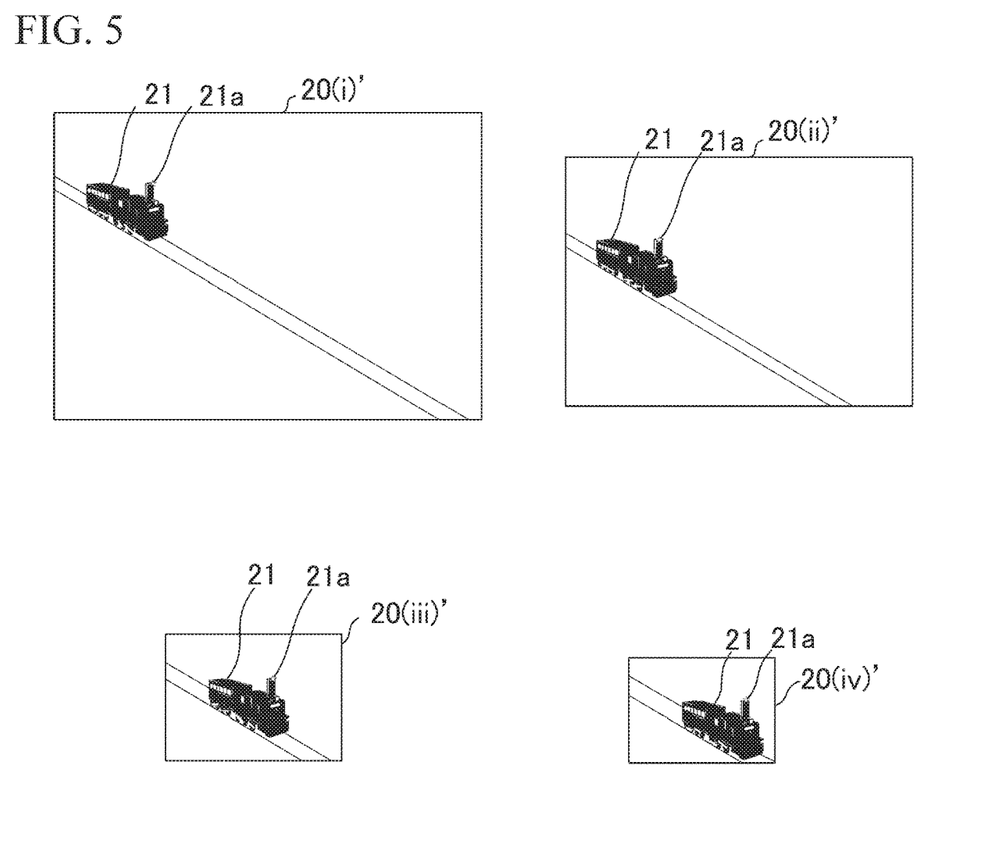
FIG. 5 is an explanatory diagram showing an example of the scaled captured images.
Figure 6:
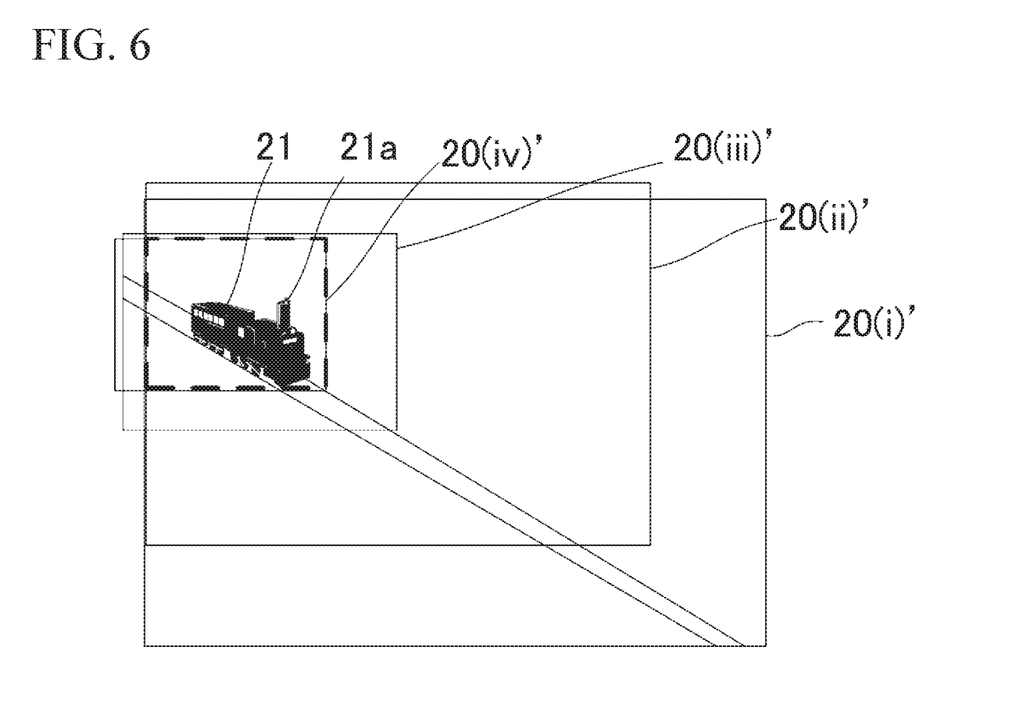
FIG. 6 is an explanatory diagram about trimming of the scaled captured images.
Figure 7:
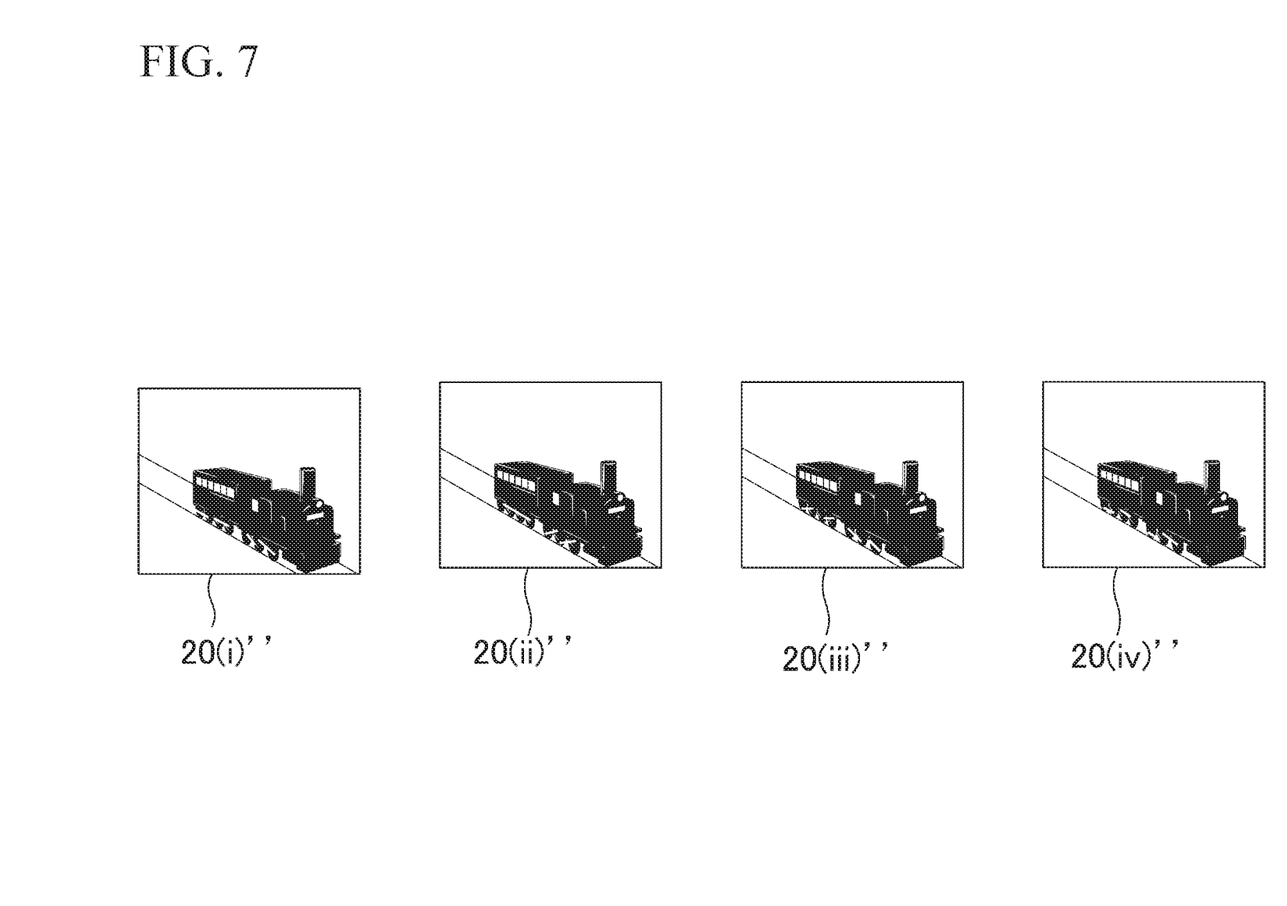
FIG. 7 is an explanatory diagram showing an example of the trimmed captured images.
Figure 8:
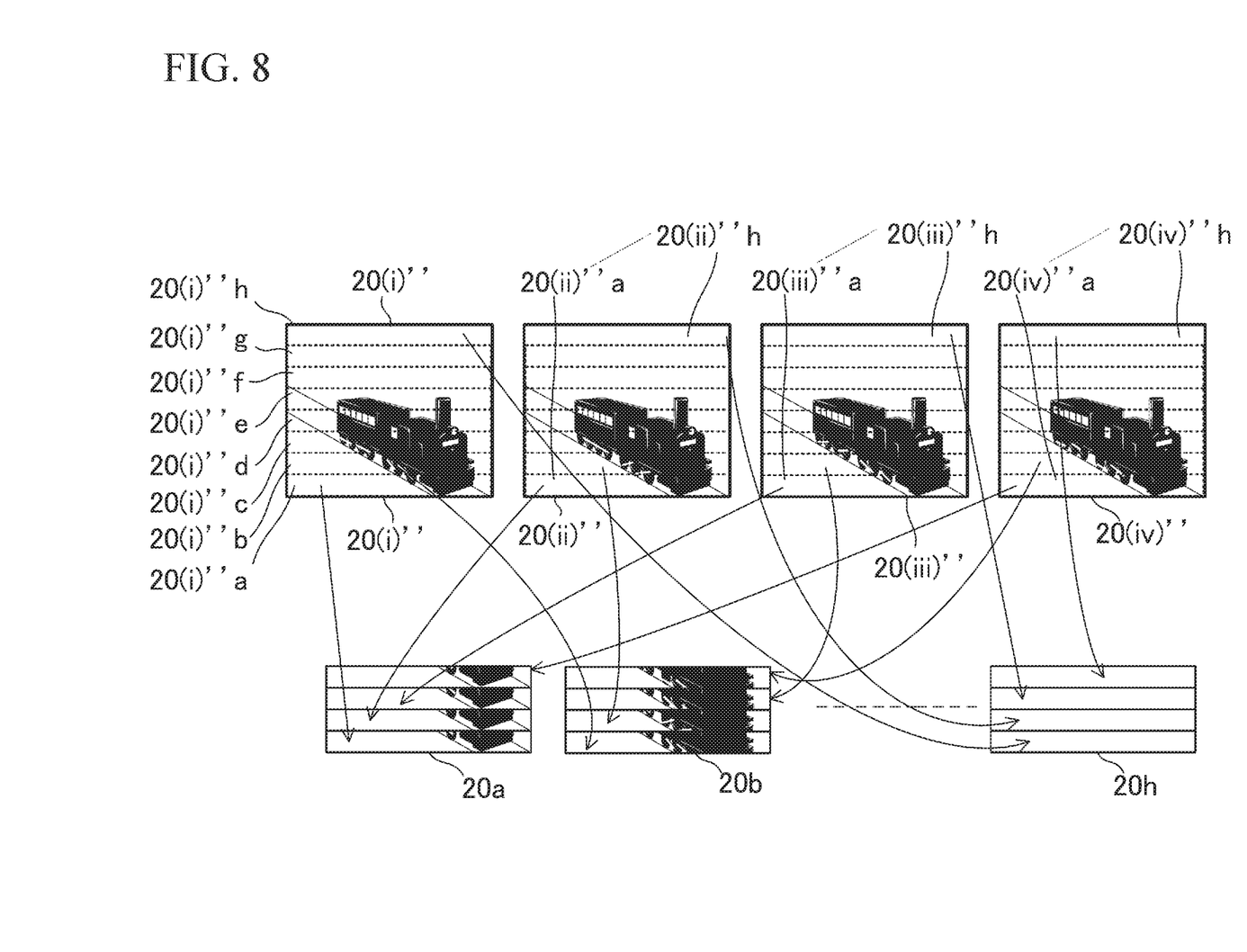
FIG. 8 is an explanatory diagram showing an example of display image strips and lenticular images produced from the trimmed captured images.

FIG. 3 is an explanatory diagram showing an example of the captured images. FIG. 4 is an explanatory diagram showing an example of a reference subject image. FIG. 5 is an explanatory diagram showing an example of scaled captured images. FIG. 6 is an explanatory diagram about trimming of the scaled captured images. FIG. 7 is an explanatory diagram showing an example of the trimmed captured images. FIG. 8 is an explanatory diagram showing an example of display image strips and lenticular images produced from the trimmed captured images.

The variable image display body 100 according to this embodiment is a variable image display body 100 including a lenticular sheet 10 having a plurality of cylindrical lenses arranged in a first direction, and lenticular images 20 arranged on a surface on the opposite side to the surface of the cylindrical lenses. The lenticular images 20 are composed in such a manner that: a plurality of captured images 20(i), 20(ii), 20(iii) and 20(iv) (hereinafter occasionally referred to as the "captured images 20(i)-20(iv)"), as an example of a plurality of images, are individually scaled so that subject images 21 which appear in the captured images 20(i)-20(iv) have the same size; thus scaled captured images 20(i)', 20(ii)', 20(iii)', 20(iv)' (hereinafter occasionally referred to as "the scaled captured images 20(i)'-20(iv)'") are subjected to position adjustment so that reference portions 21a of the subject images in the plurality of scaled captured images 20(i)'-20(iv)' are located at the same position, and are then superimposed; in the superimposed state, they are subjected to trimming on a region where a predetermined number of the scaled captured images 20(i)-20(iv) are overlapped and the subject images are included; from the respective trimmed images, display image strips 20(i)"a, 20(i)"b, 20(i)"c, 20(i)"d, . . . , 20(iv)"f, 20(iv)"g, 20(iv)"h are extracted in the form of lines, arranged at positions corresponding to the respective cylindrical lenses, so that the lenticular images 20 are composed of the display image strips.

In order to facilitate understanding of such a configuration, in the drawings, the numbers of the captured images 20(i)-20(iv) and the numbers of the cylindrical lenses on the lenticular sheet are omitted. Furthermore, although each of the actual captured images includes the background as well as the "subject image 21" as to be described later, the background is omitted from the drawings.

The captured images 20(i)-20(iv), which were obtained by shooting a moving train as a subject continuously a plurality of times as shown in FIG. 3, are explained as the source images of a variable image. If a plurality of subjects are in the captured images 20(i)-20(iv), the image of an arbitrary subject is used as the subject image 21. Here, the "subject image" is an image used as a reference in the process of scaling the captured images as to be described later. Preferably, in the captured images 20(i)-20(iv), the image of a subject whose motion is desired to be shown clearly without incongruity is the subject image 21. The size of the subject image 21 differs in each of the captured image 20(i)-20(iv) as the source images. FIG. 3 shows an example in which the image of the train in the captured images 20(i)-20(iv) is the subject image 21.

Then, the captured images 20(i)-20(iv) are enlarged or reduced (scaled) so that the subject images 21 appearing in the captured images 20(i)-20(iv) have the same size. FIG. 5 shows an example of the scaled captured images 20(i)'-20(iv)'. As shown in FIG. 5, the subject images 21 appearing in the scaled captured images 20(i)'-20(iv)' have the same size.

As a method of scaling the captured images 20(i)-20(iv), it is possible to use any method as long as the subject images 21 are made to have the same size. For example, the subject image appearing in an arbitrary captured image among the captured images 20(i) to 20(iv) (an example of one image of the present invention) is used as a reference subject image, and the other captured images (an example of other image of the present invention) other than the arbitrary captured image (the one captured image) are scaled so that the subject images appearing in the other subject images become to have the same size as the reference subject image.

It is particularly preferable that the captured image in which the subject image appears largest in size is used as the arbitrary captured image (the one captured image).

In the example of FIG. 3, since the subject image 21 appearing in the captured image 20(*iv*) has the largest size, the subject image 21 in the captured image 20(*iv*) is used as the reference subject image, and other captured images 20(*i*), 20(*ii*) and 20(*iii*) are enlarged (FIG. 5).

Specifically, as shown in FIG. 4, in the subject image 21 in the captured image 20(*iv*), a size X in the first direction, which is the same direction as the arrangement direction of the cylindrical lenses arranged on the lenticular sheet, and, a size Y in the second direction, which is a direction orthogonal to the first direction, are measured. Based on the measurement results, the other captured images 20(*i*), 20(*ii*) and 20(*iii*) are enlarged so that the size in the second direction and the size in the first direction of the subject image 21 appearing in each of the other captured images 20(*i*), 20(*ii*) and 20(*iii*) are equal to Y and X, respectively.

In the example of this embodiment, the first direction (the vertical direction in FIG. 4) corresponds to the arrangement direction of the cylindrical lenses of the lenticular sheet when the lenticular sheet and the captured images are superimposed.

Next, the scaled captured image 20(*i*)'-20(*iv*)' are superimposed so that the subject images 21 are overlapped, and then trimmed.

Specifically, a reference portion 21*a* is determined in the subject image 21, and the scaled captured images 20(*i*)'-20(*iv*)' are superimposed while adjusting positions so that the subject images 21 are located at the same position. In the example shown in FIGS. 5 and 6, positioning was performed using the top of the train chimney in the image of a train, which is the subject image, as the reference portion 21*a* (the asterisk part in FIG. 5 and FIG. 6).

After positioning, a region in which a predetermined number of the captured images 20(*i*)'-20(*iv*)' are overlapped and the subject images 21 are included is trimmed. In the example of FIG. 6, a region where all the captured images 20(*i*)'-20(*iv*)' are overlapped was trimmed. The trimmed captured images 20(*i*)", 20(*ii*)", 20(*iii*)", 20(*iv*)" are shown in FIG. 7. The trimmed captured images 20(*i*)", 20(*ii*)", 20(*iii*)", 20(*iv*)" will be occasionally referred to as the "trimmed captured images 20(*i*)"-20(*iv*)"".

Note that a region where all the captured images 20(*i*)'-20(*iv*)' are overlapped may be trimmed as shown in FIG. 6, or a region to be trimmed may be determined in consideration of the influence given to a variable image display to be completed. In other words, even though all of the captured images 20(*i*)'-20(*iv*)' are not overlapped, it is sufficient if a predetermined number of the captured images, which are considered to be essential to a variable image display to be completed, are overlapped.

Image strips are extracted from the trimmed captured image 20(*i*)"-20(*iv*)" to form lenticular images 20. The process of forming the lenticular image 20 by extracting image strips from the captured images 20(*i*)"-20(*iv*)" is the same as a conventionally well-known method of forming a lenticular image, and therefore only simple explanation is provided here.

First, as shown in FIG. 8, image strips are formed by extracting lines from each of the captured images 20(*i*)"-20(*iv*)" and arranging the lines in a predetermined order. In the example shown in FIG. 8, the extracted lines are arranged as display image strips at the positions corresponding to the cylindrical lenses.

More specifically, display image strips 20(*i*)"a, 20(*i*)"b, 20(*i*)"c, 20(*i*)"d, 20(*i*)"e, 20(*i*)"f, 20(*i*)"g, 20(*i*)"h are extracted from the captured image 20(*i*)".

Display image strips 20(*ii*)"a, 20(*ii*)"b, 20(*ii*)"c, 20(*ii*)"d, 20(*ii*)"e, 20(*ii*)"f, 20(*ii*)"g, 20(*ii*)"h are extracted from the captured image 20(*ii*)". Similarly, display image strips 20(*iii*)"a-20(*iii*)"h are extracted from the captured image 20(*iii*)", and display image strips 20(*iv*)"a-20(*iv*)"h are extracted from the captured image 20(*iv*)".

Then, the extracted display image strips are arranged to correspond to the respective cylindrical lenses, thereby forming the lenticular images 20 (20*a*, 20*b*, 20*c*, 20*d*, 20*e*, 20*f*, 20*g*, 20*h*) (hereinafter occasionally referred to as the "lenticular images 20 (20*a*-20*h*)").

Figure 9:
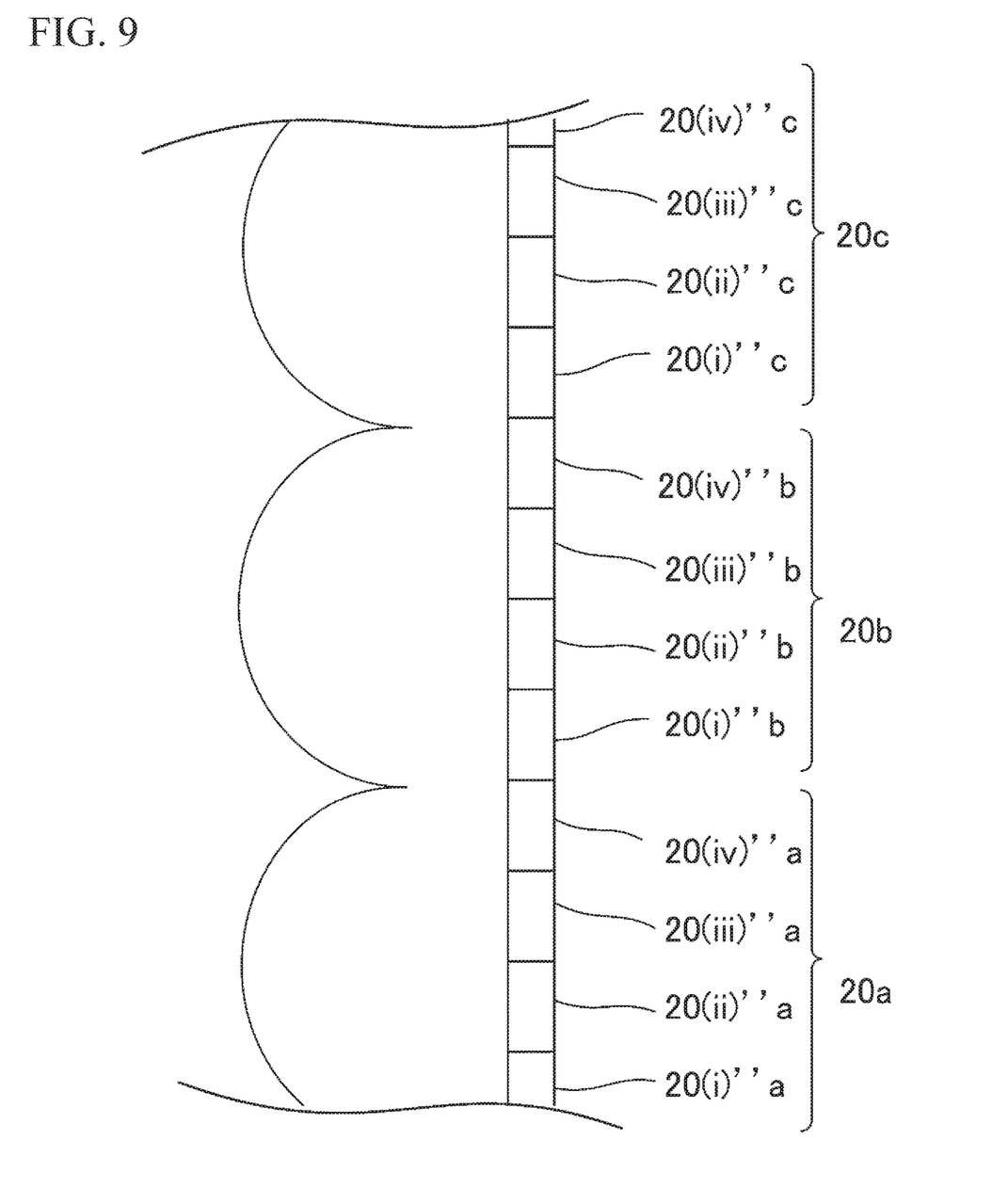
FIG. 9 is an enlarged schematic view showing an example of lenticular images formed based on the display image strips.
Figure 10:
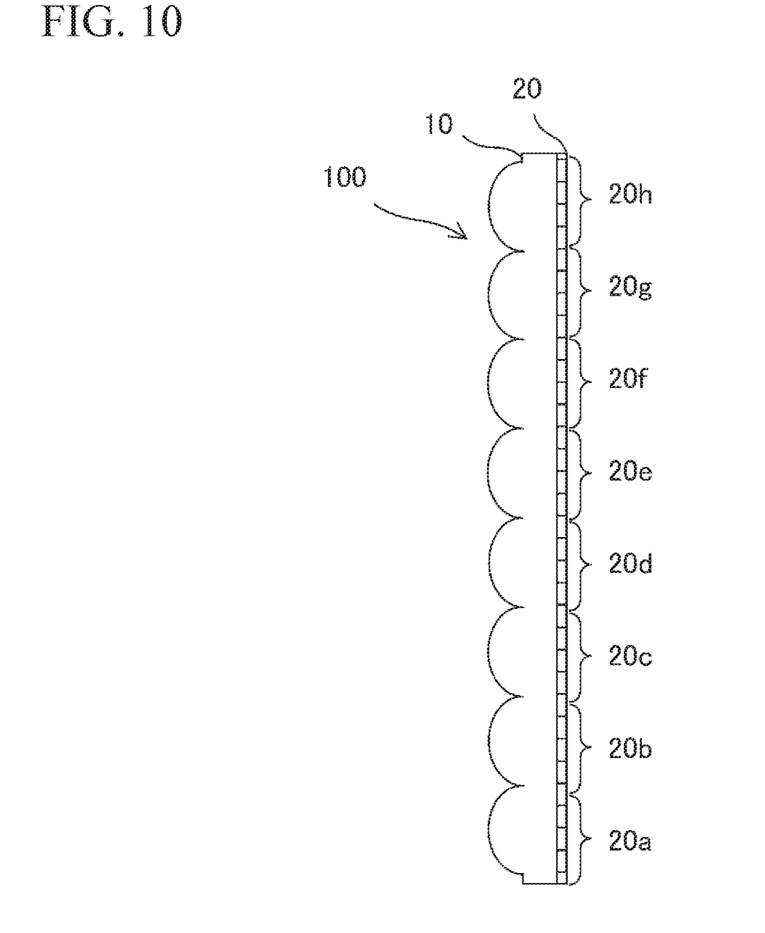
FIG. 10 is an explanatory diagram showing an example of a variable image display body with the lenticular images arranged.
Figure 11:
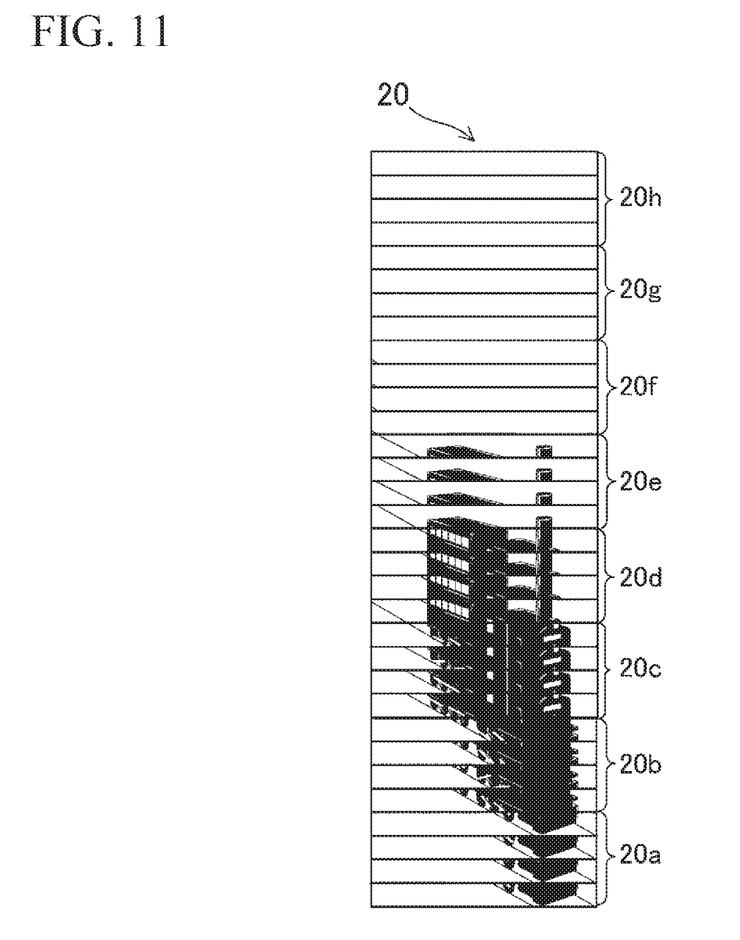
FIG. 11 is a schematic plan view of the lenticular images shown in FIG. 10.

FIG. 9 is an enlarged schematic view showing an example of lenticular images formed based on the display image strips. FIG. 10 is an explanatory diagram showing an example of the variable image display body 100 in which the lenticular images 20 (20*a*-20*h*) are arranged. FIG. 11 is a schematic plan view of the lenticular images 20 (20*a*-20*h*) shown in FIG. 10.

As shown in FIGS. 9 to 11, the display image strip 20(*i*)"a extracted from the captured image 20(*i*)", the display image strip 20(*ii*)"a extracted from the captured image 20(*ii*)", the display image strip 20(*iii*)"a extracted from the captured images 20(*iii*)", and the display image strip 20(*iv*)"a extracted from the captured image 20(*iv*)" are arranged at a position corresponding to the nth cylindrical lens to form the lenticular image 20*a*. Moreover, the display image strip 20(*i*)"b extracted from the captured image 20(*i*)", the display image strip 20(*ii*)"b extracted from the captured image 20(*ii*)", the display image strip 20(*iii*)"b extracted from the captured images 20(*iii*)", and the display image strip 20(*iv*)"b extracted from the captured image 20(*iv*)" are arranged at a position corresponding to the (n+1)th cylindrical lens to form the lenticular image 20*b*. Under other cylindrical lenses, the images strips are arranged in the same manner to form the lenticular images 20.

When the lenticular images 20 formed by images strip groups are viewed from the lens side (the left side in FIG. 11), only one of the captured images 20(*i*)"-20(*iv*)" is displayed depending on the viewing angle, and a different image is viewed by changing the viewing angle, thereby making the images look like a moving image.

As described above, according to the variable image display body of this embodiment, after equalizing the sizes of the subject images which are the images of a shooting target (subject) and appear in the captured images, respectively, lenticular images are formed. Therefore, even if the subject is a moving body such as a train or a car, there is no change in the size of the subject, and a variable image can be displayed without incongruity. Since the subject images appearing in the captured images are used, even if the subject image changes in every captured image, the image can be expressed without missing this change.

In the above-described method, the size X in the first direction of the subject image 21 in the captured images 20(*i*)-20(*iv*) and the size Y in the second direction orthogonal to the first direction are measured, and the captured images 20(*i*)-20(*iv*) are scaled based on the measurement results. However, it is also possible to calculate a scaling factor from the shooting conditions.

For example, the following will explain a case where the captured images are images obtained by continuously shooting a moving body as in the above embodiment. Specifically, suppose that X1 is a straight line distance when a moving body A came closest to a shooting point C, and a captured image shot at this time is the above-mentioned one image. The angle formed by the straight line distance X1 and a straight line distance X2 between the moving body A and the shooting point C when the other image was shot is θ1. Then, if a size A1 in the moving direction of the moving body A is found, it is possible to use the straight line distance X1, angle θ1 and size A1 as the shooting parameters and calculate the scaling factor of the other image based on the shooting parameters.

Figure 12:
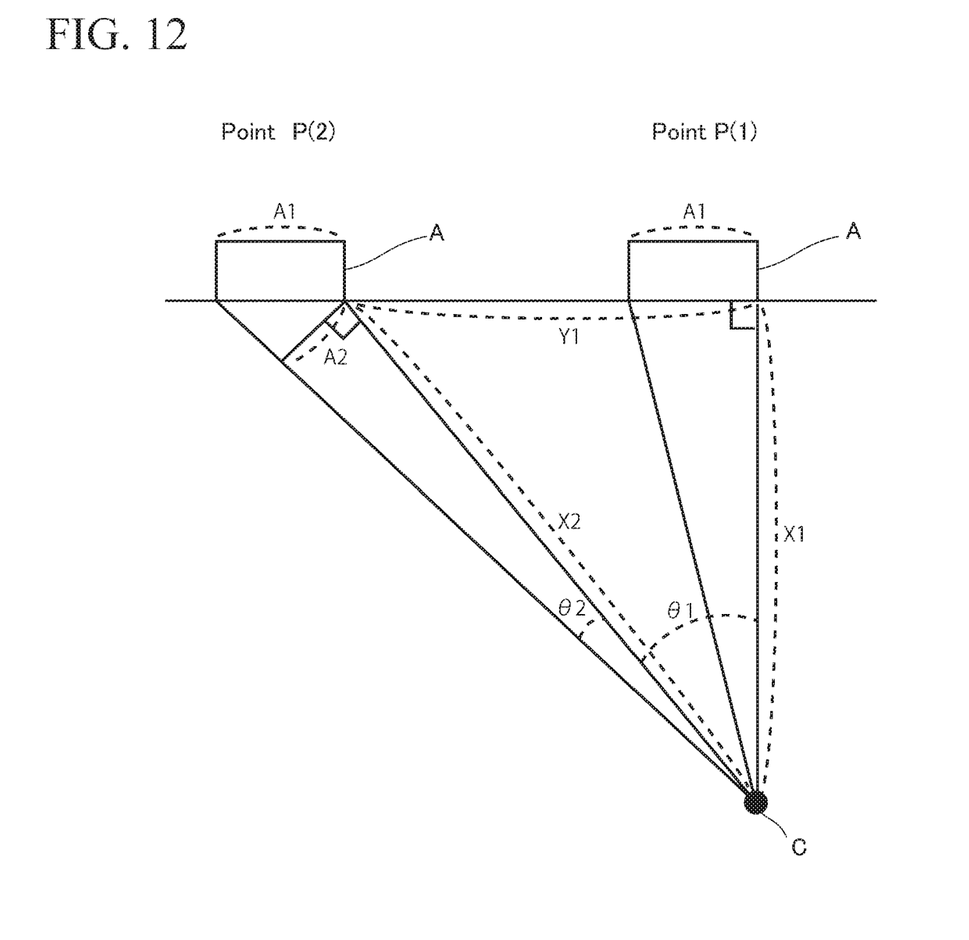
FIG. 12 is an explanatory diagram showing a calculation method of a scaling factor which is calculated based on shooting parameters.

FIG. 12 is an explanatory diagram showing an example of a calculation method of a scaling factor which is calculated based on the shooting parameters.

Suppose that the size in the moving direction of the moving body A is A1, a point where the moving body A came closest to the shooting point C is a Point P(1), the straight line distance between the shooting point C and the moving body A when the moving body A was shot at the Point P(1) is X1, the straight line distance between the shooting point C and the moving body A when the moving body A was shot at a Point P(2) is X2, and the angle formed between a straight line X1 and a straight line X2 is θ1.

The size A1 of the moving body A, the straight line X1 to the Point P(1) where the moving body A came closest to the shooting point C, and the angle θ1 formed between the straight line X1 and the straight line X2 are obtained in advance. Using the captured image shot at the Point P(1) as one captured image and the captured image shot at the Point P(2) as other captured image, a scaling factor when scaling the other image can be calculated, based on the size A1, straight line X1 and angle θ1 as the known shooting parameters.

Specifically, the captured image (other image) shot at the Point P (2) is scaled in the first direction by a first scaling factor obtained by Expression 1 below and scaled in the second direction orthogonal to the first direction by a second scaling factor obtained by Expression 2 below. The first direction is a direction orthogonal to the moving direction of the moving body A, and the second direction is the moving direction of the moving body A.

[Math. 1]

$$\frac{X_1}{\sqrt{X_1^2 + (X_1 * \tan\theta_1)^2}} \qquad \text{Expression 1}$$

$$\frac{A_1}{\sqrt{X_1^2 + (X_1 * \tan\theta_1)^2} * \tan\left(\arctan\left(\frac{(X_1 * \tan\theta_1) + A_1}{X_1}\right) - \theta_1\right)} \qquad \text{Expression 2}$$

In the example of this embodiment, the second direction is the moving direction of the moving body (the horizontal direction in FIG. 12). The first direction (the vertical direction in FIG. 12) orthogonal to the second direction corresponds to the arrangement direction of the cylindrical lenses on the lenticular sheet when the lenticular sheet and the captured images are superimposed.

As described above, the size A1 of the moving body A, the straight line X1 to the Point P (1) where the moving body A came closest to the shooting point C, and the angle θ1 formed between the straight line X1 and the straight line X2 are measured as the shooting parameters in advance, and then a scaling factor of other captured image can be obtained using these shooting parameters.

The other captured image is scaled by the obtained scaling factor, the subject images (here, the images of the moving body A) are superimposed, and trimming is performed to obtain lenticular images by the above-described method. Thus, lenticular images can be formed after equalizing the sizes of the subject images which appear in the captured images, respectively. Therefore, even if the subject is a moving body such as a train or a car, it is possible to display a variable image without a change in the size of the subject, or incongruity. Since the subject images appearing in the captured images are used, even if the subject image changes in every captured image, the image can be expressed without missing this change.

The scope of the present invention is not limited to the above embodiment. The present invention is widely applicable to a variable image display body and a lenticular image formation method that are capable of displaying a variable image without incongruity even when a subject is a moving body, such as a train or a car.

REFERENCE SIGNS LIST

100 Variable image display body
10 Lenticular sheet
20 (20a, 20b, 20c, 20d, 20e, 20f, 20g, 20h) Lenticular images
20 Subject image
21a Reference portion
20(i), 20(ii), 20(iii), 20(iv) Captured images (images)
20(i)', 20(ii)', 20(iii)', 20(iv)' Scaled captured images
20(i)", 20(ii)", 20(iii)", 20(iv)" Trimmed captured images

The invention claimed is:

1. A lenticular image formation method for forming lenticular images for displaying a variable image by a lenticular sheet having a plurality of cylindrical lenses arranged in a first direction, wherein source images of the lenticular images are a plurality of captured images obtained by continuously shooting a moving body as a subject and include subject images which are images of the moving body appearing in the plurality of captured images and moving in at least the first direction, the method comprising the steps of:
scaling each of the plurality of captured images so that the subject images appearing in the plurality of captured images have a same size;
subjecting a plurality of scaled captured images to position adjustment so that reference portions of the subject images in the plurality of scaled captured images are located at a same position, and superimposing the plurality of scaled captured images;
trimming a region in which a predetermined number of the plurality of scaled captured images are overlapped and the subject images are included; and
forming image strips arranged in a predetermined order by extracting images in a form of lines from each of trimmed captured images.

2. The lenticular image formation method according to claim 1, wherein the subject image appearing in one captured image among the plurality of captured images is used as a reference subject image, and another captured image among the plurality of captured images is scaled so that the subject image appearing in the another captured image has a same size as the reference subject image.

3. The lenticular image formation method according to claim 2, wherein the captured image having the subject image appearing largest in size among the plurality of captured images is the one captured image.

4. The lenticular image formation method according to claim 2, wherein a scaling factor is calculated based on:
- a size $A_1$ of the moving body in a moving direction;
- the one captured image which is an image shot at a time the moving body came closest to a shooting point, and a straight line distance $X_1$ between the moving body and the shooting point at the time; and
- an angle $\theta_1$ formed between a straight line connecting the moving body and the shooting point when the one captured image was shot and a straight line connecting the moving body and the shooting point when the another captured image was shot.

5. The lenticular image formation method according to claim 4, wherein
- the another captured image is scaled in the first direction by a first scaling factor obtained by Expression 1, and
- the another captured image is scaled in a second direction orthogonal to the first direction by a second scaling factor obtained by Expression 2

$$\frac{X_1}{\sqrt{X_1^2 + (X_1 * \tan\theta_1)^2}} \quad \text{Expression 1}$$

$$\frac{A_1}{\sqrt{X_1^2 + (X_1 * \tan\theta_1)^2} * \tan\left(\arctan\left(\frac{(X_1 * \tan\theta_1) + A_1}{X_1}\right) - \theta_1\right)}. \quad \text{Expression 2}$$

6. The lenticular image formation method according to claim 1, wherein the image strips arranged in the predetermine order to form each of the lenticular images.

* * * * *